(12) United States Patent
Lee

(10) Patent No.: US 8,056,102 B2
(45) Date of Patent: Nov. 8, 2011

(54) CHANNEL SELECTION DEVICE RECEIVING A MULTI-CHANNEL VIDEO AND A CHANNEL SELECTION METHOD RECEIVING A MULTI-CHANNEL VIDEO

(75) Inventor: Ji-Young Lee, Seoul (KR)

(73) Assignee: Alticast Corporation, Seoul (KR)

( * ) Notice: Subject to any disclaimer, the term of this patent is extended or adjusted under 35 U.S.C. 154(b) by 651 days.

(21) Appl. No.: 12/213,039

(22) Filed: Jun. 13, 2008

(65) Prior Publication Data

US 2008/0313677 A1    Dec. 18, 2008

(30) Foreign Application Priority Data

Jun. 18, 2007  (KR) .................. 10-2007-0059588
May 27, 2008  (KR) .................. 10-2008-0049237

(51) Int. Cl.
*H04N 5/445* (2006.01)
*G06F 13/00* (2006.01)
*G06F 3/00* (2006.01)
*H04N 5/50* (2006.01)

(52) U.S. Cl. ............... 725/56; 725/57; 725/53; 725/59; 725/61; 348/731; 348/732

(58) Field of Classification Search .............. 725/56, 725/57, 53, 59, 61; 348/731, 732
See application file for complete search history.

(56) References Cited

U.S. PATENT DOCUMENTS

| | | | | |
|---|---|---|---|---|
| 5,583,560 A * | 12/1996 | Florin et al. | ..................... | 725/40 |
| 6,405,371 B1 * | 6/2002 | Oosterhout et al. | ............ | 725/39 |
| 6,938,208 B2 * | 8/2005 | Reichardt | ..................... | 715/719 |
| 7,174,512 B2 * | 2/2007 | Martin et al. | ................. | 715/719 |
| 7,694,320 B1 * | 4/2010 | Yeo et al. | ......................... | 725/41 |
| 7,757,252 B1 * | 7/2010 | Agasse | ............................ | 725/41 |
| 2010/0122294 A1 * | 5/2010 | Craner | ............................. | 725/41 |
| 2010/0154005 A1 * | 6/2010 | Baxter | ............................ | 725/56 |

FOREIGN PATENT DOCUMENTS

| | | |
|---|---|---|
| EP | 0 755 604 B | 1/1997 |
| EP | 1 096 793 A2 | 5/2001 |
| EP | 1 246 465 A2 | 10/2002 |
| KR | 100411174 B1 | 12/2003 |
| KR | 102006-0055023 | 11/2004 |
| KR | 10-2007-0011851 | 7/2005 |
| WO | WO 95/28795 A2 | 10/1995 |
| WO | WO 98/56176 A1 | 12/1998 |
| WO | WO 01/99436 A2 | 12/2001 |
| WO | WO 2005/107245 A1 | 11/2005 |

* cited by examiner

*Primary Examiner* — Hoang-Vu A Nguyen-Ba

(74) *Attorney, Agent, or Firm* — The Nath Law Group; Jerald L. Meyer; Robert T. Burns

(57) ABSTRACT

There is provided a channel selection device receiving a multi-channel video including plural videos and video configuration information on each video from a head end. The channel selection device includes a first screen display unit editing the multi-channel video based on the video configuration information and searching view configuration information to generate a channel searching view and displaying the channel searching view on a sub-screen of a television; and a second screen display unit displaying on a main screen of the television a video selected by a viewer out of the videos included in the channel searching view.

9 Claims, 5 Drawing Sheets

FIG. 1

| CH1 | CH2 | CH3 | CH4 | CH5 |
|---|---|---|---|---|
| VIDEO1 | VIDEO2 | VIDEO3 | VIDEO4 | VIDEO5 |
| CH6 | CH7 | CH8 | CH9 | CH10 |
| VIDEO6 | VIDEO7 | VIDEO8 | VIDEO9 | VIDEO10 |
| CH11 | CH12 | CH13 | CH14 | CH15 |
| VIDEO11 | VIDEO12 | VIDEO13 | VIDEO14 | VIDEO15 |
| CH16 | CH17 | CH18 | CH19 | CH20 |
| VIDEO16 | VIDEO17 | VIDEO18 | VIDEO19 | VIDEO20 |
| CH21 | CH22 | CH23 | CH24 | CH25 |
| VIDEO21 | VIDEO22 | VIDEO23 | VIDEO24 | VIDEO25 |

CHANNEL SELECTION DEVICE RECEIVING A MULTI-CHANNEL VIDEO AND A CHANNEL SELECTION METHOD RECEIVING A MULTI-CHANNEL VIDEO

CROSS-REFERENCE TO RELATED APPLICATION

This application claims priority from and the benefit of Korean Patent Application No. 10-2007-0059588, filed on Jun. 18, 2007 and No. 10-2008-0049237, filed on May 27, 2008, which are hereby incorporated by reference for all purposes as if fully set forth herein.

BACKGROUND

1. Field

The present document is directed to a channel selection device, especially which is capable of providing a channel searching view to a viewer.

2. Related Art

Digital broadcasting may provide viewers with more broadcast channels than analogue broadcasting since it uses digitalized broadcast signals. Viewers select one of a number of broadcast channels before watching a broadcast program provided through the selected broadcast channel. When viewers lose interest in the broadcast program they currently watch or wonder what broadcasts are playing on other channels, they search other channels by clicking channel navigation (up/down) buttons on a remote control device. Viewers may find desired broadcast programs in the course of searching channels.

Digital broadcasting may provide viewers with broadcasting programs only after a broadcasting signal corresponding to a frame of broadcast signal has been received by a receiver. Accordingly the channel changing time of digital broadcasting is longer than that of analogue broadcasting. In such digital broadcasting, a head end may provide EPGs (Electronic Program Guides) to a receiver to help viewers to find desired channels quickly and easily.

In EPGS, such as mosaic EPGS and text EPGs, information associated with broadcast programs is provided to viewers through an additional channel. Mosaic EPGs are a graphic-based EPG where small broadcast images are arranged on TV screen in mosaic patterns. text EPGs are a text-based EPG where information related to broadcast programs is listed in text form. Viewers may easily select desired broadcast programs by viewing the information related to the broadcast programs included in EPGs without any need of changing channels to identify every channel.

However, conventional EPGs have a shortcoming in terms of bandwidth since they should contain configuration information on screen view as well as broadcast programs, and each channel should be assigned for each EPG view. Moreover, the conventional EPs require equipment necessary to transmit each EPG view through each channel to a receiver, and they require more time to transit from an EPG view to any other EPG view than a common channel transition time. Conventional text EPGs are provided in a text-based interface, which makes it difficult for viewers to identify them at a glance.

And, viewers are accustomed to selecting a channel, watching the channel transition, and therefore, they may dislike the conventional EPGs where all broadcast programs appear on the screen.

SUMMARY

An aspect of the present document provide a viewer with a channel searching view that is displayed on a sub-screen of a TV and has multi-channel video edited based on video configuration information and searching view configuration information.

Another aspect of the present document provides a channel selected by a viewer using the channel searching view to the viewer through a main screen of a TV.

According to an exemplary embodiment of the present document, there is provided a channel selection device receiving a multi-channel video including plural videos and video configuration information on each video from a head end, the channel selection device including: a first screen display unit editing the multi-channel video based on the video configuration information and searching view configuration information to generate a channel searching view and displaying the channel searching view on a sub-screen of a television; and a second screen display unit displaying on a main screen of the television a video selected by a viewer out of the videos included in the channel searching view.

The video configuration information may include first location information indicating a location of each video in the multi-channel video and first size information indicating a size of each video in the multi-channel video.

The searching view configuration information may include second location information indicating a location of each video in the channel searching view and second size information indicating a size of each video in the channel searching view.

The first screen display unit may include an editing unit, wherein the editing unit edits the multi-channel video by clipping each video from the multi-channel video based on the first location information and the first size information and transiting each video clipped according to the second location information.

The editing unit may scale the clipped video according to the second size information.

The first screen display unit may further include a searching view configuration unit generating a searching view generation request including the first and second location information and the first and second size information and transmitting the generated searching view generation request to the editing unit; a channel selection control unit controlling the searching view configuration unit in response to a first command; and a key input receiving unit receiving a first key input from the viewer, generating a first command corresponding to the first key input, and transmitting the generated first command to the channel selection control unit.

The channel searching view may include a reference video that may be displayed on the main screen by a viewer's selection.

The searching view generation request may include information on a video displayed on the main screen by the second screen display unit, and the editing unit sets up the video displayed on the main screen as the reference video.

The key input unit may receive a second key input from the viewer, generate a second command corresponding to the second key input, and transmit the generated second command to the channel selection control unit, the second command including modification channel information entered by the second key input, the modification channel information including information related to one of the videos located adjacent to the reference video on the channel searching view, the channel selection control unit controls the searching view configuration unit in response to the second command, the searching view configuration unit generates a channel searching request including the modification channel information according to a control of the channel selection control unit and transmits the generated channel searching request to the editing unit, and the editing unit changes the reference video into another video according to the modification channel information.

The searching view configuration information may be received from the head end or inputted by a viewer's key input.

According to an exemplary embodiment of the present document, there is provided a channel selection method receiving a multi-channel video including plural videos, video configuration information on each video, and searching view configuration information on a method of configuring a channel searching view from a head end, the channel selection method including: receiving the multi-channel video, the video configuration information, and the searching view configuration information from the head end in response to a first command corresponding to a first key input; editing the multi-channel video based on the video configuration information and the searching view configuration information to generate a channel searching view including a reference video screen, and displaying the generated channel searching view on a sub-screen of a television; displaying the channel searching view where the reference video has been changed into a video corresponding to a modification channel information on the sub-screen of the television in response to a second key command corresponding to a second key input including the modification channel information; and receiving a video broadcast through a channel of the reference video to display the video on a main screen of the television in response to a third command corresponding to a third key input.

BRIEF DESCRIPTION OF THE DRAWINGS

The above and other features of the present invention will be described in reference to certain exemplary embodiments thereof with reference to the attached drawings in which:

FIG. 1 is a view illustrating a multi-channel video received by a channel selection device according to an exemplary embodiment of the present document;

DETAILED DESCRIPTION

Hereinafter, exemplary embodiments of the present document will be described in detail. The document is described more fully hereinafter with reference to the accompanying drawings, in which embodiments of the document are shown. This document may, however, be embodied in many different forms and should not be construed as limited to the embodiments set for the herein.

FIG. 1 depicts a multi channel video received by a channel selection device according to an exemplary embodiment of the present document.

Referring to FIG. 1, the multi-channel video that corresponds to one view of a television screen includes a plurality of videos VIDEO1 to VIDEO 25. The videos VIDEO1 to VIDEO 25 refer to broadcast programs broadcast through a plurality of channels CH1 to CH25. The number of the videos may vary with application. Each of the videos VIDEO 1 to VIDEO 25 occupies a part of the multi-channel video with a constant area. The multi-channel video may be prepared at a head end located in a broadcasting station and transmitted to the channel selection device.

Figure 2:
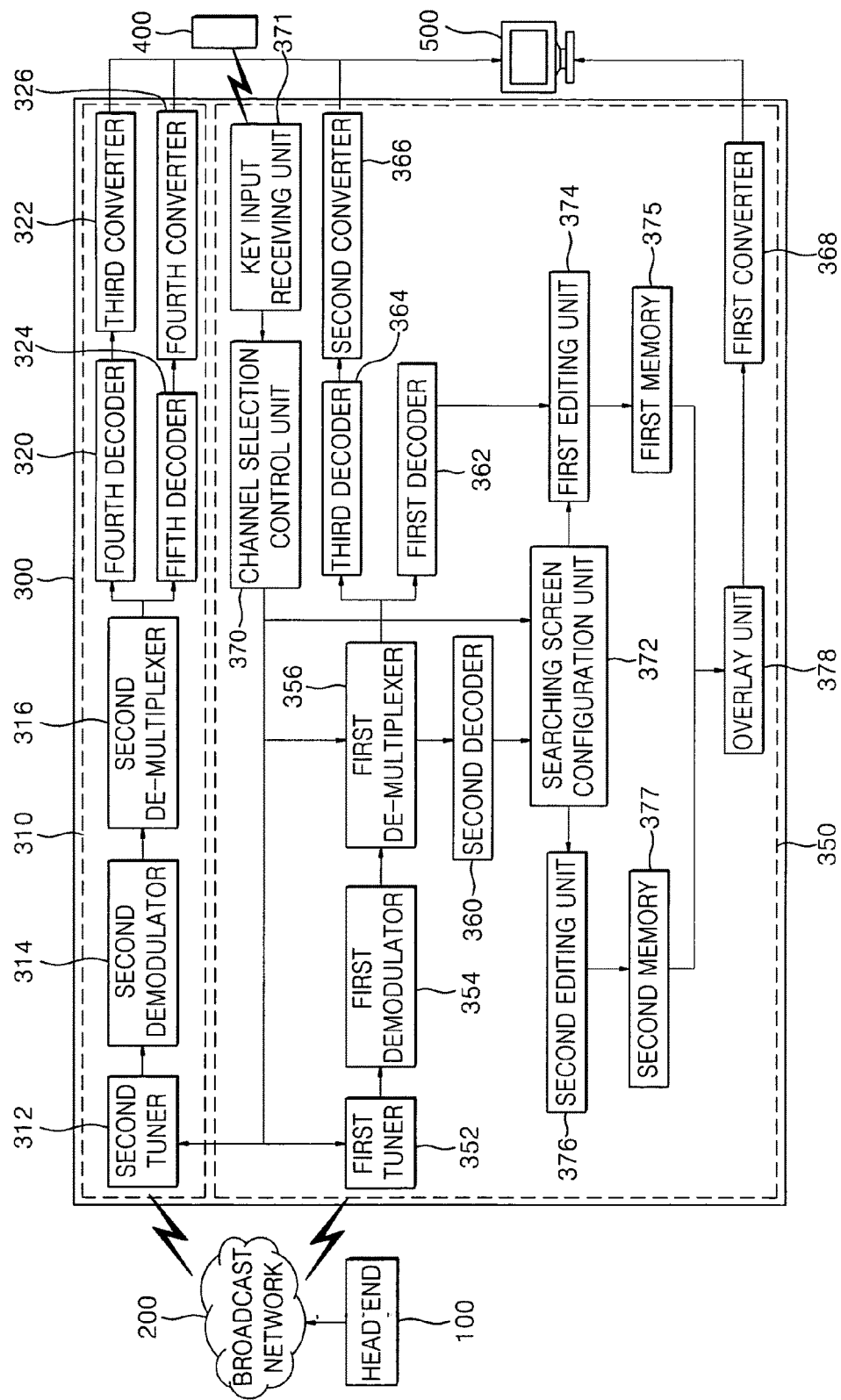
FIG. 2 is a block diagram illustrating a channel selection device according to an exemplary embodiment of the present document.

FIG. 2 is a block diagram illustrating a channel selection device according to an exemplary embodiment of the present document. Referring to FIG. 2, the channel selection device 300 may receive a broadcast signal including a multi-channel video, video configuration information, and searching view configuration information from a head end 100 through a broadcast network 200.

The video configuration information is information associated with a plurality of videos included in the multi-channel video. The video configuration information includes first location information, first size information, and channel information. The first location information may indicate the location of each video on the multi-channel video and the first size information may indicate the size of each video. The channel information is information on channels through which the videos are broadcast. The channel information includes a channel name, a channel number, and information on a frequency assigned to each channel.

The searching view configuration information is information on a method of configuring a channel searching view. The searching view configuration information includes second location information, third location information, and second size information. The second location information indicates where each video is arranged on the channel searching view, and the third location information indicates where the channel information is located on the channel searching view. The second size information indicates the size of each video to be displayed on the channel searching view.

The channel selection device 300 may edit the videos of the multi-channel video based on the video configuration information and the searching view configuration information to produce a channel searching view and then display the produced channel searching view on the television screen so that a viewer may view it. Such editing includes clipping, scaling, and transiting. The clipping clips each video out of the multi-channel video based on the first location information and the first size information. The scaling scales the size of the clipped video based on the second size information. The transiting arranges the clipped video on the channel searching view based on the second location information. The transiting includes arranging the channel information on the television based on the third location information.

In an exemplary configuration of the channel selection device 300, the channel selection device 300 may include a first screen display unit 350 and a second screen display unit 310. The first screen display unit 350 displays a channel searching view on a television sub-screen. The television sub-screen corresponds to a part of the overall television screen. For example, the television sub-screen may be a rectangular screen that may be arranged at a lower part, or left or right part of the television screen.

The channel searching view is displayed on the television sub-screen, where the plural videos in the multi-channel video are rearranged. The videos include a reference video that may be displayed on a television main screen by a viewer's selection. The reference video may be a video that is located at the middle of the videos or highlighted.

More specifically, the first screen display unit 350 includes a first tuner 352, a first demodulator 354, a first de-multiplexer 356, a first decoder 362, a second decoder 360, a third decoder 364, a first converter 368, a second converter 366, a searching view configuration unit 372, a first editing unit 374, a first memory 375, a second editing unit 376, a second memory 377, a overlay unit 378, a key input receiving unit 371, and a channel selection control unit 370.

The key input receiving unit 371 generates a command in response to a viewer pressing a key provided on a key input means 400, such as a remote controller and a key board, and supplies the generated command to the channel selection control unit 370. The command includes a channel searching start (CSS) command, a channel searching end (CSE) command, a channel search performing (CSP) command, and a channel selection (CS) command. The key input means 400 may include a selection key for selecting the channel corresponding to the television main screen and a control key for controlling the television sub-screen (for example, a key for the CSP command and the CS command) separately from each other.

The CSS command enables the device 300 to provide a channel searching view to the viewer. The CSE command enables the device 300 to end the provision of the channel searching view. The CSP command enables the device 300 to change a current reference video that appears on the channel searching view into another video located adjacent to the current reference video according to modification channel information. The modification channel information, which is entered by the viewer pressing a key, may include channel information on the video located adjacent to the current reference video. The CS command enables the device 300 to receive a video broadcast through a channel for reference video and view the received video on the television main screen.

The channel selection control unit 370 controls the first and second tuners 352 and 312, the first multiplexer 356, and the searching view configuration unit 372 in response to a command received from the key input receiving unit 371. When receiving a CSS command from the key input receiving unit 371, the channel selection control unit 370 generates a first tuning request that allows the first tuner 352 to tune a channel through which the multi-channel video is broadcast and a demodulating request that allows the first demodulator 354 to demodulate the broadcast signal. In addition, the channel selection control unit 370 controls the searching view configuration unit 372 in response to the CSS command and transfers current channel information to the searching view configuration unit 372. The current channel information is information on the video displayed by the second screen display unit 310 on the television main screen. The current channel information may include a channel number or a channel name.

When receiving a CSE command, the channel selection control unit 370 requests the first tuner 352 to end tuning. When receiving a CSP command, the channel selection control unit 370 controls the searching view configuration unit 372 in response to the CSP command. When receiving a CS command, the channel selection control unit 370 generates a second tuning request that allows the second tuner 312 to tune a channel through which the reference video is broadcast.

The first tuner 352 receives broadcast signal broadcast through a channel corresponding to the first tuning request generated by the channel selection control unit 370. The broadcast signal includes a multi-channel video, a plurality of audio, a video configuration information, and a searching view configuration information. The audios correspond to a plurality of videos included in the multi-channel video. The first tuner 352 transmits the received broadcast signal to the first demodulator 354.

The first demodulator 354 demodulates the broadcast signal transmitted from the first tuner 352 and transmits the demodulated broadcast signal to the first de-multiplexer 356.

The first de-multiplexer 356 de-multiplexes the demodulated broadcast signal transmitted from the first demodulator 354 into the multi-channel video, the audios, the video configuration information, and the searching view configuration information according to a de-multiplexing request. The first de-multiplexer 356 transmits the multi-channel video to the first decoder 362, and the video configuration information and the searching view configuration information to the second decoder 360. The first de-multiplexer 356 extracts an audio corresponding to the reference video out of the channel searching view according to a request from the channel selection control unit 370 and transmits the extracted audio to the third decoder 364.

The first decoder 362 decodes the multi-channel video transmitted from the first de-multiplexer 356 to generate an uncompressed original multi-channel video. The first decoder 362 transmits the decoded multi-channel video to the first memory 375.

The second decoder 360 decodes the video configuration information and the searching view configuration information transmitted from the first de-multiplexer 356 and transmits the decoded video configuration information and searching view configuration information to the searching view configuration unit 372.

The third decoder 364 decodes the audio transmitted from the first de-multiplexer 356 to generate an uncompressed original multi-channel video. The third decoder 364 transmits the decoded audio to the second converter 366.

The second converter 366 performs digital-to-analog (D/A) conversion on the audio transmitted from the third decoder 364. A television 500 outputs the D/A converted audio as voice.

The searching view configuration unit 372 receives the video configuration information and searching view configuration information from the second decoder 360 and generates a searching view generation request, a channel searching request, and a graphic editing request under control of the channel selection control unit 370. More specifically, the searching view configuration unit 372 generates a searching view generation request and a graphic editing request and transmits the searching view generation request and the graphic editing request to the first editing unit 374 and the second editing unit 376, respectively, under control of the channel selection control unit 370 that performs the CSS command. The searching view generation request includes video configuration information (first location information and first size information), searching view configuration information (second location information and second size information), and current channel information. The graphic editing request includes video configuration information (channel information) and searching view configuration information (third location information). The searching view configuration unit 372 generates a channel searching request and a graphic editing request and transmits the channel searching request and the graphic editing request to the first editing unit 374 and the second editing unit 376, respectively, under control of the channel selection control unit 370 that performs the CSP command. The channel searching request may include modification channel information.

The first editing unit 374 edits the multi-channel video stored at the first memory 375 and rearranges the plurality of videos on the multi-channel video according to the searching view generation request transmitted from the searching view configuration unit 372. More specifically, the first editing unit 374 clips each video from the multi-channel video based on the first location information and the first size information out of the video configuration information. The first editing unit 374 transits each video clipped according to the second location information for each video out of the searching view configuration information, and generates an editing image on which the videos are rearranged. The first editing unit 374 may scale each video clipped according to the second size information before transiting each video.

The first editing unit 374 arranges the videos to be located adjacent to each other with respect to the reference video, video corresponding to current channel information, so that the reference video is located at the center of the videos appearing on the channel searching view. The first editing unit 374 may highlight the reference video so that the reference video may be distinguished from the other neighboring videos.

The first editing unit 374 edits the edited image stored at the first memory 375 according to the channel searching request transmitted from the searching view configuration unit 372 and rearranges the plurality of videos on the multi-channel video. More specifically, the first editing unit 374 changes the reference video by placing the video associated with the modification channel information in the center of the channel searching view. For example, if the channel for the video that is currently located in the center of the channel searching view is channel CH5, and the channel corresponding to the modification channel information is channel CH6, then the first editing unit 374 may place the video broadcast through channel CH6 in the center of the channel searching view. The editing unit 374 may re-edit the edited image using pointers that indicate addresses of the videos included in the edited image. The term "address" refers to a location where each video is stored in the first memory 375.

The first memory 375 stores the multi-channel video provided from the first decoder 362 and the edited image provided from the first editing unit 374.

The second editing unit 376 edits the channel information with graphic images according to the graphic editing request provided from the searching view configuration unit 372 and stores the edited channel information in the second memory 377. For example, the second editing unit 376 arranges the channel name and channel number out of the channel information according to the third location information and generates a graphic image including the channel name and channel number.

The second memory 377 stores the graphic image provided from the second editing unit 376.

The overlay unit 378 overlays the edited image and graphic image provided from the first memory 375 and the second memory 377, respectively, to generate a channel searching view, and transmits the generated channel searching view to the first converter 368.

The first converter 362 performs digital-to-analog conversion on the channel searching view transmitted from the overlay unit 378 and provides the analog channel searching view to a television 500. The television 500 displays the analog channel searching view on the sub-screen for viewers.

Next, the second screen display unit 310 displays the reference video of the channel searching view on the main screen according to a viewer's selection. The main screen of the television 500 includes the overall screen of the television 500 or the other areas but the sub-screen of the television 500. The second screen display unit 310 includes a second tuner 312, a second demodulator 314, a second de-multiplexer 316, a fourth decoder 320, a fifth decoder 324, a third converter 322, and a fourth converter 326.

The second tuner 312 receives broadcast signal broadcast through a channel corresponding to a second tuning request generated by the channel selection control unit 370.

The second demodulator 314 demodulates the broadcast signal transmitted from the second tuner 312 and transmits the demodulated broadcast signal to the second de-multiplexer 316.

The second de-multiplexer 316 de-multiplexes the demodulated broadcast signal transmitted from the second demodulator 314 into a video and an audio. The second multiplexer 316 transmits the audio to the fourth decoder 320 and the video to the fifth decoder 324.

The fourth decoder 320 decodes the audio transmitted from the second de-multiplexer 316 to generate an uncompressed original audio and transmits the uncompressed audio to the third converter 322. The third converter 322 performs digital-to-analog conversion on the audio transmitted from the fourth decoder 320 and transmits the analog audio to a television 500. A television 500 outputs the D/A converted audio as voice.

The fifth decoder 324 decodes the video transmitted from the second multiplexer 316 to generate an uncompressed original video and transmits the uncompressed video to the fourth converter 326. The fourth converter 326 performs digital-to-analog conversion on the video transmitted from the fifth decoder 324 and transmits the analog video to the television 500. The television 500 displays the analog video on the main screen of the television 500.

Although a case has been described in the above exemplary embodiments of the present document, where the searching view configuration information is transmitted from the head end to the channel selection device along with the multi-channel video, the present document is not limited thereto. For example, the searching view configuration information may be previously stored in the channel selection device, or directly transmitted to the channel selection device by a viewer pressing a certain key.

Figure 3:
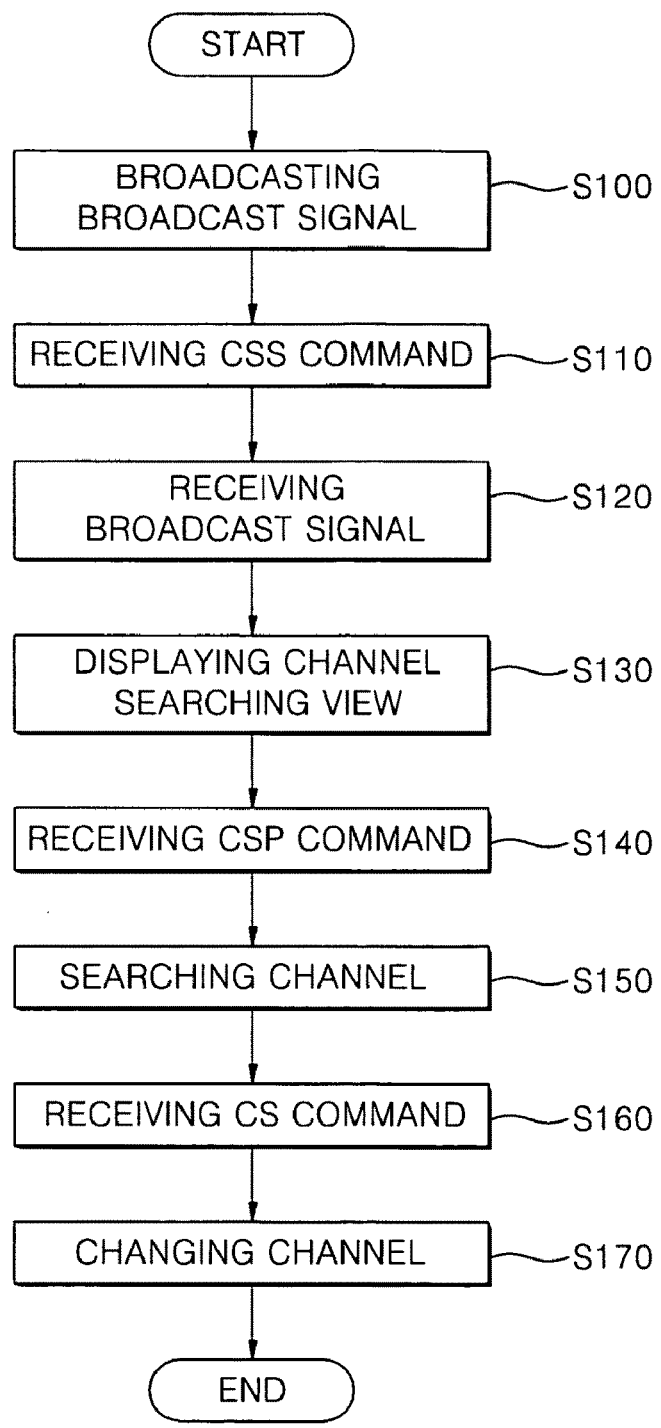
FIG. 3 is a flowchart illustrating a channel selection method using the channel selection device shown in FIG. 2.

FIG. 3 is a flowchart illustrating a channel selection method using the channel selection device shown in FIG. 2. Referring to FIG. 3, the channel selection method includes broadcasting a broadcast signal (step S100), receiving a start command (step S110), receiving a broadcast signal (step S120), providing a searching view (step S130), receiving a searching command (step S140), searching a channel (step S150), receiving a selection command (step S160), and changing a channel (step S170).

In the step S100, a head end transmits a broadcast signal including a multi-channel video, video configuration information, and searching view configuration information through a specific channel over a broadcast network. The broadcast network may include a terrestrial broadcast network, a cable broadcast network, and a satellite broadcast network.

In the step S110, a channel selection device receives a CSS command generated by a viewer pressing a first key. The CSS command may be inputted to the channel selection device by the viewer pressing a specific key on a key input means such as a remote control.

In the step S120, the channel selection device tunes a specific channel to receive the broadcast signal including the multi-channel video, the video configuration information, and the searching view configuration information. The specific channel is a channel assigned to a broadcast signal by the head end to broadcast the broadcast signal including the multi-channel video.

In the step S130, the channel searching view generated by the channel selection device is displayed on a sub-screen of a television so that a viewer may see the channel searching view. More specifically, the channel selection device extracts the multi-channel video, the video configuration information, and the searching view configuration information from the received broadcast signal, and edits the multi-channel video based on the video configuration information and the searching view configuration information to generate a channel searching view. The channel searching view is displayed on the television sub-screen, where the plural videos in the multi-channel video are rearranged. A reference video in the channel searching view may be the video displayed on the main screen of the television when the channel selection device receives the CSS command from the viewer in the step S110.

In the step S140, the channel selection device receives a CSP command generated by a viewer pressing a second key. The CSP command includes modification channel information inputted by the viewer. In the step S150, the channel selection device provides the viewer with a new channel searching view where the reference video has been changed into another by the channel selection device based on the modification channel information. In the steps S140 and S150, the viewer may search a broadcast program which he desires to watch while simultaneously viewing the channel searching view displayed on the sub-screen of the television.

In the step S160, the channel selection device receives a CS command generated by the viewer pressing a third key. In the step S160, the viewer may select whether the reference video of the channel searching view is displayed on the main screen of the television.

In the step S170, the reference video of the channel searching view is displayed on the main screen of the television. More specifically, the channel selection device tunes the channel through which the reference video is broadcast to receive the broadcast signal, demodulates the received broadcast signal, de-multiplexes the demodulated broadcast signal into a video, and displays the de-multiplexed video on the main screen of the television.

Figure 4:
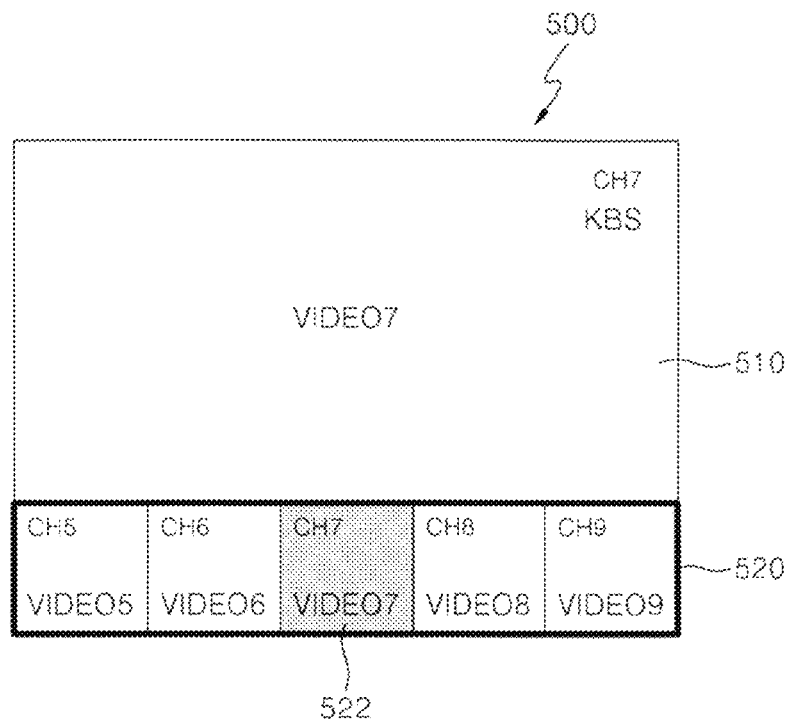
FIG. 4 is a view illustrating a first exemplary channel searching view displayed on a television screen by the channel selection device shown in FIG. 2.

FIG. 4 is a view illustrating an exemplary channel searching view displayed on a television screen by the channel selection device shown in FIG. 2. Referring to FIG. 4, the screen of television 500 includes a main screen 510 and a sub-screen 520.

If a CSS command is inputted to a channel searching device by a viewer who currently watches video 7 broadcast through channel 7, the channel selection device displays a channel searching view, i.e. edited channel selection screen, on the sub-screen 520 of the television 500 while simultaneously displaying video 7 on the main screen of the television 500. In the channel searching view, the reference video 522 is video 7 being currently displayed on the main screen 510 of the television 500.

A viewer may change the reference video 522 of the channel searching view by entering a key corresponding to a CSP command into the channel selection device while simultaneously viewing the videos broadcast through plural channels on the channel searching view. The key corresponding to the CSP command may include an "UP" key and a "DOWN" key for channel searching.

Figure 5:
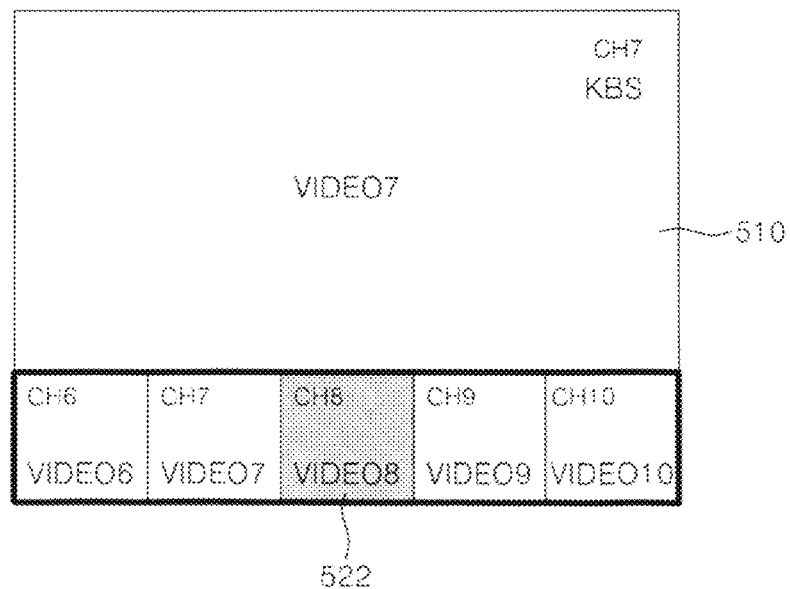
FIG. 5 is a view illustrating a second exemplary channel searching view that has a different reference video from that of the first exemplary channel searching view, where the reference video has been altered by a viewer watching the first exemplary channel searching view.
Figure 6:
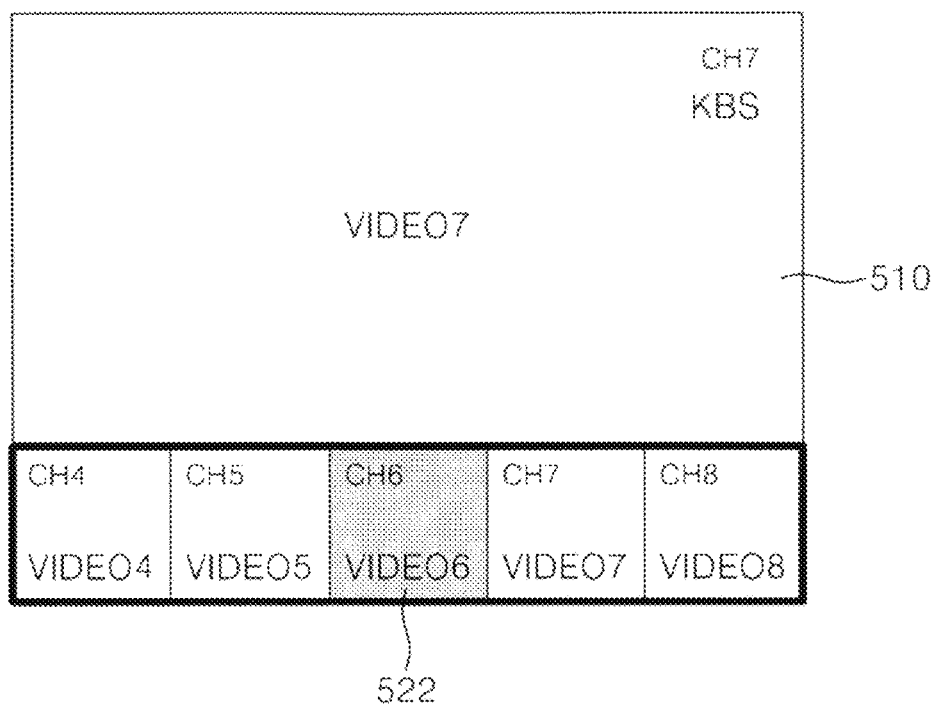
FIG. 6 is a view illustrating a third exemplary channel searching view that has a different reference video from that of the first exemplary channel searching view, where the reference video has been altered by a viewer watching the first exemplary channel searching view.

FIG. 5 is a view illustrating the channel searching view whose reference video has been altered by a viewer watching the channel searching view. Referring to FIG. 5, the channel selection device changes the reference video 522 from video 7 to video 8 when the "UP" key is pressed by a viewer. FIG. 6 is a view illustrating a third exemplary channel searching view that has a different reference video from that of the first exemplary channel searching view, where the reference video has been altered by a viewer watching the first exemplary channel searching view. Referring to FIG. 6, the channel selection device changes the reference video 522 from video 7 to video 6 when the "DOWN" key is pressed by a viewer. The viewer may continuously change the reference video by performing consecutive input operations.

The channel selection device may display the reference video of the channel searching view shown in FIG. 5 or 6 on the main screen 510 of the television 500 in response to a CS command by the viewer.

As described above, the present document may display the channel searching view, i.e. edited multi-channel video, on the sub-screen of the television and a video selected by the viewer through the channel searching view on the main screen of the television based on the video configuration information and the searching view configuration information. Therefore, the viewer may search a desired broadcast program by clicking channel navigation (up/down) buttons without any delay in channel conversion time.

The present document includes a separate tuner for the main screen and the sub screen of the television, and therefore, may display a video on the main screen as well as some other videos on the sub-screen.

Although the present document has been described with reference to certain exemplary embodiments thereof, it will be understood by those skilled in the art that a variety of modifications and variations may be made to the present document without departing from the spirit or scope of the present document defined in the appended claims, and their equivalents.

What is claimed is:

1. A channel selection device receiving a multi-channel video including a plurality of videos and video configuration information on each video from a head end, the channel selection device comprising:

a first screen display unit editing the multi-channel video based on the video configuration information and searching view configuration information to generate a channel searching view and displaying the channel searching view on a sub-screen of a television; and a second screen display unit displaying on a main screen of the television a video selected by a viewer out of the videos included in the channel searching view, wherein the channel searching view is displayable on the television together with the video selected by the viewer, wherein the video configuration information comprises first location information indicating a location of each video in the multi-channel video and first size information indicating a size of each video in the multi-channel video, wherein the searching view configuration information comprises second location information indicating a location of each video in the channel searching view and second size information indicating a size of each video in the channel searching view, wherein the first screen display unit comprises an editing unit, wherein the editing unit edits the multi-channel video by clipping each video from the multi-channel video based on the first location information and the first size information and transiting each video clipped according to the second location information.

2. The channel selection device of claim 1, wherein the editing unit scales the clipped video according to the second size information.

3. The channel selection device of claim 2, wherein the first screen display unit further comprises:
- a searching view configuration unit generating a searching view generation request including the first and second location information and the first and second size information and transmitting the generated searching view generation request to the editing unit;
- a channel selection control unit controlling the searching view configuration unit in response to a first command; and
- a key input receiving unit receiving a first key input from the viewer, generating a first command corresponding to the first key input, and transmitting the generated first command to the channel selection control unit.

4. The channel selection device of claim 3, wherein the channel searching view comprises a reference video that is displayable on the main screen by a viewer's selection.

5. The channel selection device of claim 4, wherein the searching view generation request comprises information on a video displayed on the main screen by the second screen display unit, and the editing unit sets up the video displayed on the main screen as the reference video.

6. The channel selection device of claim 5, wherein the key input unit receives a second key input from the viewer, generates a second command corresponding to the second key input, and transmits the generated second command to the channel selection control unit, the second command including modification channel information entered by the second key input, the modification channel information including information related to one of the videos located adjacent to the reference video on the channel searching view, the channel selection control unit controls the searching view configuration unit in response to the second command, the searching view configuration unit generates a channel searching request including the modification channel information according to a control of the channel selection control unit and transmits the generated channel searching request to the editing unit, and the editing unit changes the reference video into another video according to the modification channel information.

7. The channel selection device of claim 1, wherein the searching view configuration information is received from the head end or inputted by a viewer's key input.

8. A channel selection method receiving a multi-channel video including a plurality of videos, video configuration information on each video, and searching view configuration information on a method of configuring a channel searching view from a head end, the channel selection method comprising:
- receiving the multi-channel video, the video configuration information, and the searching view configuration information from the head end in response to a first command corresponding to a first key input;
- editing the multi-channel video based on the video configuration information and the searching view configuration information to generate a channel searching view including a reference video screen, and displaying the generated channel searching view on a sub-screen of a television;
- displaying the channel searching view where a reference video has been changed into a video corresponding to a modification channel information on the sub-screen of the television in response to a second key command corresponding to a second key input including the modification channel information; and
- receiving a video broadcast through a channel of the reference video to display the video on a main screen of the television in response to a third command corresponding to a third key input, wherein the channel searching view is displayable on the television together with the video selected by the viewer, wherein the video configuration information comprises first location information indicating a location of each video in the multi-channel video and first size information indicating a size of each video in the multi-channel video, wherein the searching view configuration information includes second location information indicating a location of each video in the channel searching view and second size information indicating a size of each video in the channel searching view, and wherein said editing includes editing the multi-channel video by clipping each video from the multi-channel video based on the first location information and the first size information and transiting each video clipped according to the second location information.

9. The method of claim 8, wherein said editing includes scaling the clipped video according to the second size information.

* * * * *